No. 783,178. PATENTED FEB. 21, 1905.
H. M. COSEY.
NUT LOCK.
APPLICATION FILED NOV. 23, 1904.

Witnesses
H. H. Hunt.
E. C. Brown

Inventor
Henry M. Cosey.
By Walter N. Haskell.
Attorney

No. 783,178.

Patented February 21, 1905.

UNITED STATES PATENT OFFICE.

HENRY M. COSEY, OF STERLING, ILLINOIS.

NUT-LOCK.

SPECIFICATION forming part of Letters Patent No. 783,178, dated February 21, 1905.

Application filed November 23, 1904. Serial No. 233,930.

*To all whom it may concern:*

Be it known that I, HENRY M. COSEY, a citizen of the United States, residing at Sterling, in the county of Whiteside and State of Illinois, have invented certain new and useful Improvements in Nut-Locks; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention has reference to nut-locks, and is more specially designed to prevent the loosening of nuts on the larger kinds of bolts in use on railways or on heavy machinery, where there is more or less vibration.

My device comprises a washer, means for locking such washer to the bolt, and further means for locking the nut to such washer, the same being adapted to be used in connection with the usual bolt and nut without any change in the construction thereof.

The arrangement and operation of the parts employed will more fully appear from the following specification, reference being had to the accompanying drawings, in which—

Figure 1:
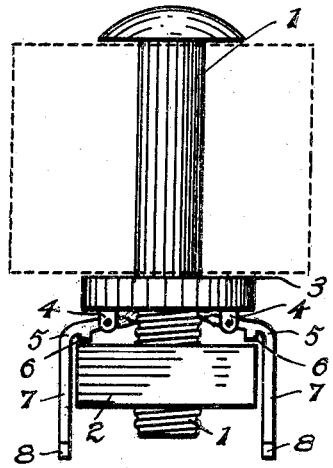
Figure 2:
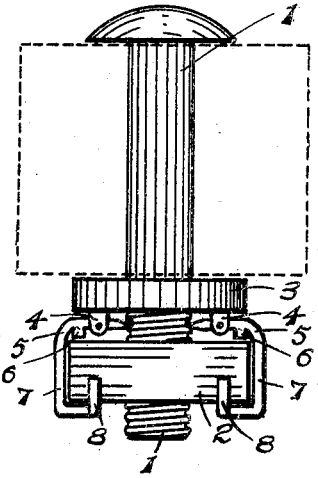
Figure 3:
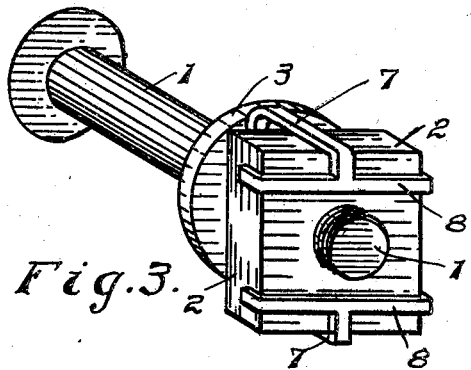
Figure 4:
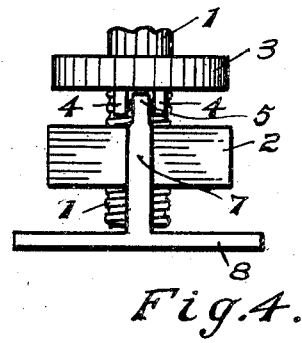
Figure 5:
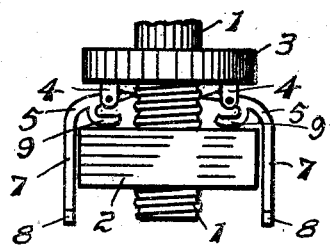
Figure 6:
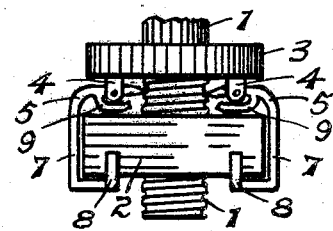

Figure 1 is a side view showing the position of the parts before the nut is fully seated on the bolt. Fig. 2 is a similar view with the nut seated and locked in place. Fig. 3 is a perspective showing the under side of the nut when secured in place. Fig. 4 is a side view of my device, showing one of the outer faces of the strip 7. Figs. 5 and 6 illustrate a modified form of my invention.

Similar ordinals refer to similar parts throughout the several figures.

1 is the usual bolt, and 2 the nut fixed on the threaded end thereof. A washer 3 is interposed between the nut 2 and the object in which the bolt is seated, such washer being provided on that face thereof adjacent to the nut 2 with two pairs of ears 4. Between each pair of ears 4 is pivotally supported a dog 5, such dogs having inner pointed ends in proximity to the thread of the bolt. On their lower faces each of the dogs 5 is provided with a lug 6, with which lugs the nut 2 comes in contact as it is turned upon the bolt. The continued turning of the nut forces the outer ends of the dogs upwardly or toward the washer, throwing the inner ends of such dogs away from the washer and slightly in the direction of the bolt, causing the pointed ends of such dogs to impinge the threads of the bolt, preventing the turning of the washer thereon.

Extending from the outer ends of the dogs 5 and integral therewith is a pair of metal strips 7 of sufficient length to extend below the lower face of the nut 2 when the same is in position. Each of the strips 7 is provided at its lower end with a cross-strip 8 of similar construction therewith. After the nut 2 is in position, with the washer 3 locked to the bolt 1, the ends of the strips 7 are bent beneath the nut and the ends of the cross-strips 8 turned at an angle embracing the nut and preventing the turning thereof. The nut can be removed, if desired, by disengaging the ends of the cross-strips 8 and strips 7.

In Figs. 5 and 6 are shown a modification of my device in which the lugs 6 are replaced with spring-arms 9, the operation and effect thereof being substantially the same as in the former construction.

The washer 3 has free movement upon the bolt 1, being forced upon such bolt by the progress of the nut in being turned thereon until it comes in contact with the object in which the bolt is seated, after which the continued movement of the nut operates the dogs 5, as hereinbefore mentioned.

What I claim as my invention, and desire to secure by Letters Patent of the United States, is—

The combination, with the bolt 1 and nut 2 thereon, of the washer 3, supported on the bolt 1, beneath said nut; a pair of dogs 5, pivotally secured to the outer face of said washer, and adapted to engage the threads of the bolt with their inner ends; the outer ends of said dogs being provided on their outer faces with means of engagement with the nut 2, to operate said dogs upon the turning of the nut upon the bolt; and a pair of flexible metal strips 7, integral with the outer ends of the dogs 5, and provided at their outer ends with cross-strips 8, substantially as shown and described.

In testimony whereof I affix my signature in presence of two witnesses.

HENRY M. COSEY.

Witnesses:
R. W. E. MITCHELL,
C. H. WOODBURN.